(12) United States Patent
Brennan et al.

(10) Patent No.: US 12,522,042 B1
(45) Date of Patent: Jan. 13, 2026

(54) LINKED GAS CHAMBERS FOR E-SWAY DISCONNECT

(71) Applicant: Fox Factory, Inc., Duluth, GA (US)

(72) Inventors: Andrew Brennan, Pleasanton, CA (US); Patrick Burke, Scotts Valley, CA (US); Rick Strickland, Winder, GA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 18/925,792

(22) Filed: Oct. 24, 2024

(51) Int. Cl.
*B60G 21/055* (2006.01)
*B60G 17/08* (2006.01)

(52) U.S. Cl.
CPC ......... *B60G 21/0558* (2013.01); *B60G 17/08* (2013.01); *B60G 2202/135* (2013.01); *B60G 2202/242* (2013.01)

(58) Field of Classification Search
CPC ............... B60G 21/0558; B60G 17/08; B60G 2202/135; B60G 2202/242
See application file for complete search history.

(56) References Cited

U.S. PATENT DOCUMENTS

| | | |
|---|---|---|
| 2,836,431 A | 5/1958 | Antoine |
| 2,941,815 A | 6/1960 | Josef |
| 3,357,512 A | 12/1967 | Wilson |
| 3,602,470 A | 8/1971 | Reynolds |
| 3,871,635 A | 3/1975 | Unruh et al. |
| 3,986,118 A | 10/1976 | Madigan |
| 4,159,756 A | 7/1979 | Murakami et al. |
| 4,183,509 A | 1/1980 | Nishikawa et al. |
| 4,589,528 A | 5/1986 | Axthammer et al. |
| 4,773,671 A | 9/1988 | Inagaki |
| 4,921,080 A | 5/1990 | Lin |
| 4,958,704 A | 9/1990 | Leiber et al. |
| 4,984,819 A | 1/1991 | Kakizaki et al. |
| 5,027,303 A | 6/1991 | Witte |
| 5,035,306 A | 7/1991 | Ashiba |
| 5,105,918 A | 4/1992 | Hagiwara et al. |

(Continued)

FOREIGN PATENT DOCUMENTS

| | | |
|---|---|---|
| CN | 116568533 A | 8/2023 |
| DE | 2849015 A1 | 5/1980 |

(Continued)

OTHER PUBLICATIONS

European Examination Report for EP Application No. 21215569.1, 5 pages, Mailed Jan. 8, 2025.

(Continued)

*Primary Examiner* — Toan C To

(57) ABSTRACT

A damper link associated with a sway bar system is disclosed. The damper link can include a damper chamber with a first fluid reservoir, a shaft configured to move in an out the damper chamber, and a piston. The damper link can further include a negative gas chamber housed in the damper chamber wherein a gas in the gas chamber is compressed or decompressed by a movement of the piston. The damper link can further include an additional reservoir with a positive gas chamber. The damper link can further include a hose fluidly connecting the negative gas chamber to the positive gas chamber to maintain a constant gas pressure between the negative gas chamber to the positive gas chamber.

13 Claims, 6 Drawing Sheets

(56) References Cited

U.S. PATENT DOCUMENTS

| | | |
|---|---|---|
| 5,149,131 A | 9/1992 | Sugasawa et al. |
| 5,171,036 A | 12/1992 | Ross |
| 5,172,794 A | 12/1992 | Ward |
| 5,186,486 A | 2/1993 | Hynds et al. |
| 5,236,520 A | 8/1993 | Gallagher |
| 5,265,703 A | 11/1993 | Ackermann |
| 5,295,705 A | 3/1994 | Butsuen et al. |
| 5,362,094 A | 11/1994 | Jensen |
| 5,390,949 A | 2/1995 | Naganathan et al. |
| 5,522,280 A | 6/1996 | Bexten |
| 5,597,180 A | 1/1997 | Ganzel et al. |
| 5,624,105 A | 4/1997 | Runkel |
| 5,630,623 A | 5/1997 | Ganzel |
| 5,899,472 A | 5/1999 | Burke et al. |
| 5,952,823 A | 9/1999 | Sprecher et al. |
| 5,987,366 A | 11/1999 | Jun |
| 6,073,536 A | 6/2000 | Campbell |
| 6,135,434 A | 10/2000 | Marking |
| 6,244,398 B1 | 6/2001 | Girvin et al. |
| 6,250,658 B1 | 6/2001 | Sakai |
| 6,276,693 B1 | 8/2001 | Oakley et al. |
| 6,427,812 B2 | 8/2002 | Crawley et al. |
| 6,457,730 B1 | 10/2002 | Urbach |
| 6,520,510 B1 | 2/2003 | Germain et al. |
| 6,669,208 B1 | 12/2003 | Monk et al. |
| 6,863,291 B2 | 3/2005 | Miyoshi |
| 6,935,157 B2 | 8/2005 | Miller |
| 7,234,714 B2 | 6/2007 | Germain et al. |
| 7,374,028 B2 | 5/2008 | Fox |
| 7,384,053 B1 | 6/2008 | Boecker et al. |
| 7,472,914 B2 | 1/2009 | Anderson et al. |
| 7,484,603 B2 | 2/2009 | Fox |
| 7,997,588 B2 | 8/2011 | Ohnuma et al. |
| 8,220,807 B2 | 7/2012 | Lorenzon et al. |
| 8,534,687 B2 | 9/2013 | Coombs et al. |
| 8,550,223 B2 | 10/2013 | Cox et al. |
| 8,627,932 B2 * | 1/2014 | Marking .............. F16F 9/5126 188/266.6 |
| 8,807,542 B2 | 8/2014 | Wootten et al. |
| 8,838,335 B2 | 9/2014 | Bass et al. |
| 8,857,580 B2 | 10/2014 | Marking |
| 8,899,560 B2 | 12/2014 | Allen et al. |
| 8,955,653 B2 | 2/2015 | Marking |
| 9,033,122 B2 | 5/2015 | Ericksen et al. |
| 9,058,038 B2 | 6/2015 | Zhang et al. |
| 9,120,362 B2 | 9/2015 | Marking |
| 9,239,090 B2 * | 1/2016 | Marking .............. B60G 17/08 |
| 9,303,712 B2 | 4/2016 | Cox |
| 9,340,088 B2 | 5/2016 | Otake et al. |
| 9,353,818 B2 | 5/2016 | Marking |
| 9,452,654 B2 | 9/2016 | Ericksen et al. |
| 9,471,697 B2 | 10/2016 | Lortz et al. |
| 9,491,788 B1 | 11/2016 | Kasai et al. |
| 9,623,716 B2 | 4/2017 | Cox |
| 9,682,604 B2 | 6/2017 | Cox et al. |
| 9,797,467 B2 | 10/2017 | Wootten et al. |
| 10,036,443 B2 | 7/2018 | Galasso et al. |
| 10,040,329 B2 | 8/2018 | Ericksen et al. |
| 10,047,817 B2 | 8/2018 | Ericksen et al. |
| 10,060,499 B2 | 8/2018 | Ericksen et al. |
| 10,086,673 B2 | 10/2018 | Baales et al. |
| 10,415,662 B2 | 9/2019 | Marking |
| 10,443,671 B2 | 10/2019 | Marking |
| 10,737,546 B2 | 8/2020 | Tong |
| 10,825,266 B2 | 11/2020 | Srinivasan et al. |
| 10,933,710 B2 | 3/2021 | Tong |
| 10,981,429 B2 | 4/2021 | Tsiaras et al. |
| 11,097,590 B2 | 8/2021 | Simula et al. |
| 11,173,767 B2 | 11/2021 | Cox |
| 11,192,424 B2 | 12/2021 | Tabata et al. |
| 11,584,182 B1 | 2/2023 | Smith |
| 11,634,003 B2 | 4/2023 | Negishi et al. |
| 11,878,678 B2 | 1/2024 | Krosschell et al. |
| 11,904,648 B2 | 2/2024 | Graus et al. |
| 11,926,189 B2 | 3/2024 | Tsiaras et al. |
| 11,993,121 B1 | 5/2024 | Schubart et al. |
| 12,083,850 B2 * | 9/2024 | Strickland .............. F16F 9/20 |
| 12,404,847 B2 | 9/2025 | Schubart et al. |
| 2002/0125675 A1 | 9/2002 | Clements et al. |
| 2004/0113377 A1 | 6/2004 | Klees |
| 2004/0173985 A1 | 9/2004 | Bruhl et al. |
| 2004/0231904 A1 | 11/2004 | Beck et al. |
| 2005/0077696 A1 * | 4/2005 | Ogawa .............. B60G 17/0162 280/124.157 |
| 2005/0082127 A1 | 4/2005 | Barber et al. |
| 2006/0287791 A1 | 12/2006 | Boon et al. |
| 2007/0235955 A1 | 10/2007 | Mizukoshi et al. |
| 2008/0129000 A1 | 6/2008 | Munday et al. |
| 2008/0203694 A1 | 8/2008 | Gartner et al. |
| 2009/0140501 A1 | 6/2009 | Taylor et al. |
| 2009/0267311 A1 | 10/2009 | Ohnuma et al. |
| 2010/0225084 A1 | 9/2010 | Chapman et al. |
| 2012/0018263 A1 * | 1/2012 | Marking .............. F16F 9/065 188/266.2 |
| 2012/0205843 A1 | 8/2012 | Allen et al. |
| 2013/0197755 A1 | 8/2013 | Otake et al. |
| 2013/0228404 A1 * | 9/2013 | Marking .............. F16F 9/19 188/266.2 |
| 2013/0292218 A1 | 11/2013 | Ericksen et al. |
| 2014/0008160 A1 | 1/2014 | Marking et al. |
| 2014/0224606 A1 | 8/2014 | Baales et al. |
| 2014/0239602 A1 | 8/2014 | Blankenship et al. |
| 2015/0083535 A1 | 3/2015 | Ericksen et al. |
| 2015/0224845 A1 | 8/2015 | Avadhany et al. |
| 2015/0290991 A1 | 10/2015 | Cox |
| 2016/0265615 A1 | 9/2016 | Marking |
| 2017/0120713 A1 | 5/2017 | Drozdowski et al. |
| 2017/0129302 A1 | 5/2017 | Jackson |
| 2017/0136842 A1 | 5/2017 | Anderson et al. |
| 2017/0282669 A1 | 10/2017 | Cox et al. |
| 2018/0345747 A1 | 12/2018 | Boon et al. |
| 2019/0001775 A1 | 1/2019 | Anderson et al. |
| 2019/0100071 A1 | 4/2019 | Tsiaras et al. |
| 2019/0241039 A1 | 8/2019 | Simula et al. |
| 2019/0360505 A1 | 11/2019 | Belter et al. |
| 2020/0180385 A1 * | 6/2020 | Marking .............. F16F 9/19 |
| 2021/0061052 A1 | 3/2021 | Kim |
| 2021/0086581 A1 | 3/2021 | Smith |
| 2021/0114431 A1 | 4/2021 | Cox |
| 2021/0197640 A1 | 7/2021 | Yamashita |
| 2021/0229519 A1 | 7/2021 | Tsiaras et al. |
| 2021/0309063 A1 | 10/2021 | Negishi et al. |
| 2021/0309064 A1 | 10/2021 | Negishi et al. |
| 2021/0316716 A1 | 10/2021 | Krosschell et al. |
| 2022/0016949 A1 | 1/2022 | Graus et al. |
| 2022/0105777 A1 | 4/2022 | Cox |
| 2022/0134835 A1 | 5/2022 | Izak et al. |
| 2022/0144035 A1 | 5/2022 | Al Sakka et al. |
| 2022/0176769 A1 | 6/2022 | Tong |
| 2022/0194161 A1 | 6/2022 | Negishi et al. |
| 2022/0242186 A1 | 8/2022 | Tong |
| 2022/0242190 A1 | 8/2022 | Stanford et al. |
| 2022/0355638 A1 | 11/2022 | Worley |
| 2022/0388362 A1 | 12/2022 | Graus et al. |
| 2023/0111759 A1 | 4/2023 | Vandersmissen et al. |
| 2023/0113777 A1 | 4/2023 | Vandersmissen et al. |
| 2023/0113819 A1 | 4/2023 | Vandersmissen et al. |
| 2023/0114717 A1 | 4/2023 | Boon et al. |
| 2023/0115594 A1 | 4/2023 | Calchand et al. |
| 2023/0202252 A1 | 6/2023 | Smith |
| 2023/0249702 A1 | 8/2023 | Peterson et al. |
| 2023/0256785 A1 | 8/2023 | Worley |
| 2023/0271473 A1 | 8/2023 | Strickland et al. |
| 2023/0294603 A1 | 9/2023 | Dwyer et al. |
| 2023/0302865 A1 * | 9/2023 | Tong .............. B60G 17/08 |
| 2023/0302866 A1 | 9/2023 | Tong et al. |
| 2023/0302867 A1 | 9/2023 | Tong et al. |
| 2024/0100904 A1 | 3/2024 | Negishi et al. |
| 2024/0131892 A1 | 4/2024 | Graus et al. |
| 2024/0198753 A1 * | 6/2024 | Peterson .............. B60W 40/10 |
| 2024/0286452 A1 * | 8/2024 | Jensen .............. B60G 17/08 |

(56) References Cited

U.S. PATENT DOCUMENTS

2024/0375474 A1* 11/2024 Tsiaras ................... C12N 9/88
2025/0083489 A1    3/2025 Strickland et al.

FOREIGN PATENT DOCUMENTS

| DE | 102005045177 A1 | 3/2007 |
| DE | 112005003567 T5 | 3/2008 |
| DE | 102012006928 A1 | 11/2012 |
| DE | 202013100681 U1 | 4/2013 |
| DE | 202013007733 U1 | 10/2013 |
| DE | 102021104176 A1 | 8/2021 |
| EP | 0648625 A1 | 4/1995 |
| EP | 0829383 A2 | 3/1998 |
| EP | 1000782 A2 | 5/2000 |
| EP | 1022169 A2 | 7/2000 |
| EP | 1238833 A1 | 9/2002 |
| EP | 2123933 A2 | 11/2009 |
| EP | 1961649 B1 | 12/2010 |
| EP | 3461663 A1 | 4/2019 |
| EP | 4112339 A1 | 1/2023 |
| EP | 4197830 A1 | 6/2023 |
| EP | 4253106 A1 | 10/2023 |
| EP | 4269137 A1 | 11/2023 |
| FR | 2927020 A1 | 8/2009 |
| FR | 3040331 A1 | 3/2017 |
| FR | 3101809 A1 | 4/2021 |
| GB | 2006131 A | 5/1979 |
| GB | 2343663 A | 5/2000 |
| GB | 2351951 A | 1/2001 |
| GB | 2377415 A | 1/2003 |
| GB | 2377415 B | 9/2003 |
| JP | S61146612 A | 7/1986 |
| JP | H0419210 A | 1/1992 |
| JP | H04191115 A | 7/1992 |
| JP | H11165521 A | 6/1999 |
| JP | 2001105827 A | 4/2001 |
| JP | 2002264625 A | 9/2002 |
| JP | 2016211676 A | 12/2016 |
| WO | 0166969 A1 | 9/2001 |
| WO | 2016060066 A1 | 4/2016 |
| WO | 2018215176 A1 | 11/2018 |
| WO | 2020214666 A1 | 10/2020 |
| WO | 2022016155 A1 | 1/2022 |

OTHER PUBLICATIONS

European Examination Report for EP Application No. 21215569.1, 9 pages, Mailed May 16, 2024.
European Extended Search Report for European Application No. 20879677.1, 8 Pages, Mailed Oct. 23, 2023.
European Search Report for European Application No. 23158363.4, 8 pages, Sep. 6, 2023.
European Search Report for EP Application No. 21215569.1, 9 pages, Mailed May 10, 2022.
European Search Report for European Application No. 22215230.8, 9 Pages, Apr. 4, 2023.
European Search Report for European Application No. 23170219.2, 9 Pages, Aug. 22, 2023.
Extended European Search Report for EP Application 22177563.8, dated Nov. 11, 2022, 14 pages.
PCT International Search Report for PCT/US2020/056869, 11 Pages, Mailed Jan. 12, 2021.
Extended European Search Report for EP Application 18197941.0 dated Feb. 27, 2019, 11 pages.
Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.

* cited by examiner

LINKED GAS CHAMBERS FOR E-SWAY DISCONNECT

FIELD OF THE INVENTION

Embodiments of the present technology relate generally to linked gas chambers in an end link of a sway bar that is part of an electronic sway system or e-sway for disconnect.

BACKGROUND

A sway bar (anti-sway bar, roll bar, anti-roll bar, stabilizer bar) is a part of an automobile suspension that reduces the body roll of a vehicle. The sway bar is basically a torsion spring that resists body roll motions. Often, it is formed from a cylindrical steel bar patterned in a "U" shape. A conventional sway bar assembly includes a sway bar and also includes two end links. Typically, the first of the two end links is flexibly coupled to one end of the sway bar, and the second of the two end links is flexibly coupled to the other end of the sway bar. Each of the two end links are then connected to a location on the vehicle near a wheel or axle (such as coupled to a control arm or other suspension feature) at respective left and right sides of the suspension for the vehicle. As a result, when the left and right sides of the suspension move together, the sway bar rotates about its mounting points. However, when the left and right sides of the suspension move relative to one another, the sway bar is subjected to torsion and forced to twist. The twisting of the sway bar transfers the forces between a heavily-loaded suspension side (the side of the vehicle subjected to more roll movement force than the other side of the vehicle) to the opposite, lesser-loaded, suspension side (the side of the vehicle subjected to lesser roll movement force than the other side of the vehicle).

BRIEF DESCRIPTION OF THE DRAWINGS

Aspects of the present invention are illustrated by way of example, and not by way of limitation, in the accompanying drawings, wherein.

Figure 1A:
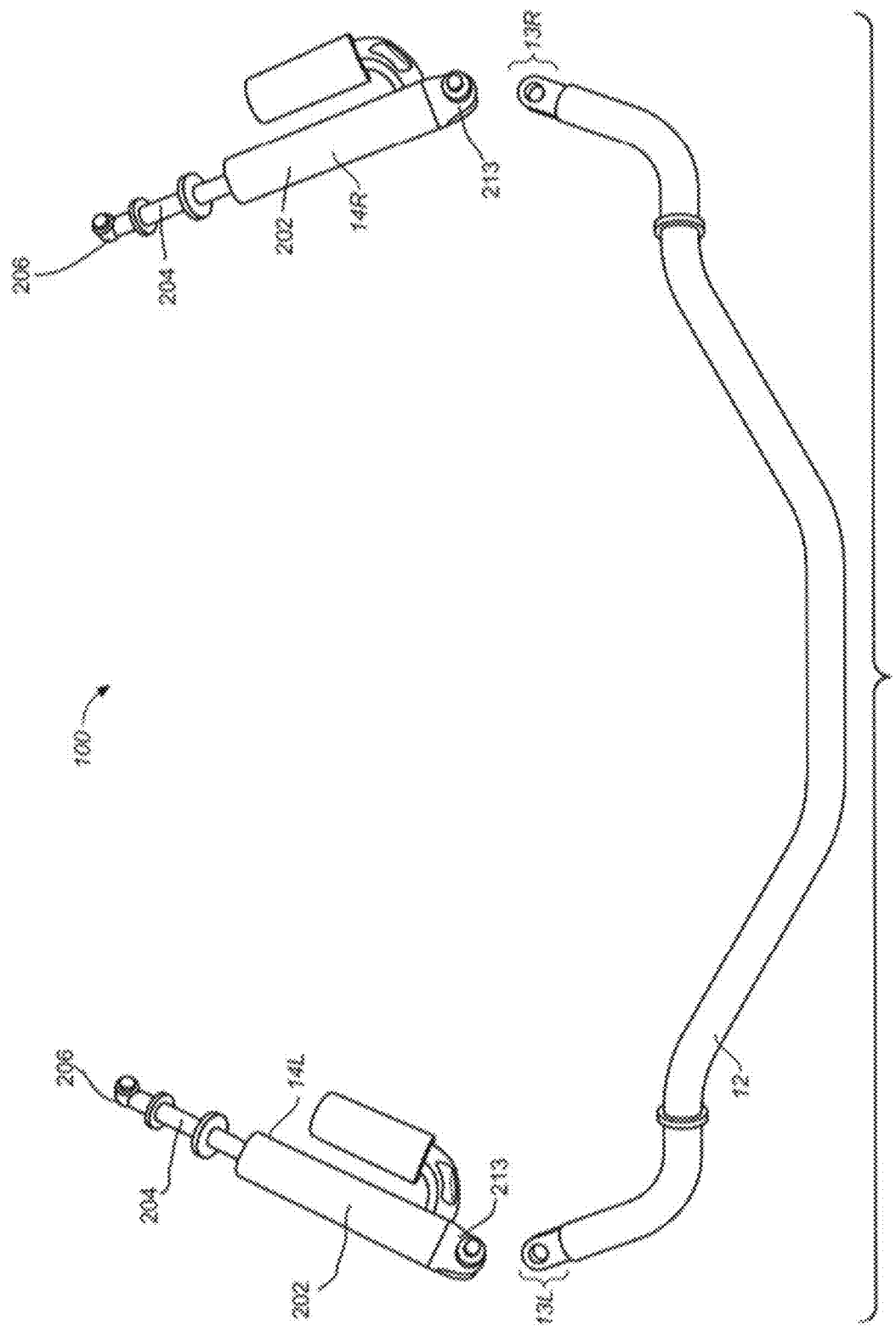
FIG. 1A is a perspective view of a sway bar system including a sway bar and two electronically controlled damper links, in accordance with one embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

In the following discussion, embodiments of the sway bar system with controllable end links (also referred to herein as an "E-Sway Bar" system) are described in detail. As will be described below, embodiments of the sway bar system advantageously enable remote input (e.g., manual remote input or automatic remote input) to manipulate the stiffness of the sway bar system. The stiffness of the sway bar system can be thought of as, for example, a driver's (or passenger's) perception of the "roll stability" of the vehicle. In other words, the perception of the driver (or passenger) of the vehicle for the vehicle to resist or allow "roll motion". As one example, when riding in a vehicle (e.g., a sports car) which appears to provide significant resistance to a rolling motion of the vehicle, it can be said that the vehicle has a "stiff" sway bar system. As another example, when riding in a vehicle (e.g., a motorhome or bus) which appears to not provide significant resistance to a rolling motion of the vehicle, it can be said that the vehicle has a "soft" sway bar system.

It will be understood that a "soft" sway bar system is desired in various conditions. For example, a soft sway bar system provides better vehicle suspension performance during rock crawling and some slow driving activities. However, in a regular or higher speed driving situation, a "soft" sway bar system could make a driver or passengers feel motion sickness, provide a lack of steering control, and ultimately lead to a vehicle rollover or other loss of control accident.

In one embodiment, the physical disconnection of the sway bar from the suspension will provide additional performance enhancements and capabilities during slow maneuvering such as rock crawling, 4-wheeling, and other slower driving/obstacle clearing activities where maximum suspension articulation is desired, needed, and/or warranted. Further, it will be understood that "stiff" sway bar system is desired in various conditions such as normal speed driving, faster speed driving, or driving in a location or conditions that are not rock crawling and other slower driving/obstacle clearing activities, e.g., in locations where maximum articulation is not more important than ensuring the vehicle does not tip over due to body roll, or the like.

In contrast, in one embodiment a "soft" or range of softer settings of a connected sway bar system provides increased handling and body roll control during normal speed cornering and various driving activities. For example, it will be understood that a stiff sway bar system provides increased handling and control during high-speed cornering and various racing activities.

In one embodiment, a "hard" or range of settings from medium to all the way locked out settings of a connected sway bar system will provide increased handling and body roll control during high-speed cornering and various racing activities.

Further, in the following discussion, the term "active", as used when referring to a valve or damping component, means adjustable, manipulatable, etc., during typical operation of the valve. For example, a remotely controllable active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, a remotely controllable active valve may also be configured to automatically adjust its operation, and corresponding damping characteristics, based upon, for example, operational information pertaining to the vehicle and/or the suspension with which the valve is used. Similarly, it will be understood that in some embodiments, a remotely controllable active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g., raise or lower) a wheel with respect to the vehicle. In a "semi-active suspension", no motive force/actuator is employed to adjust move (e.g., raise or lower) a wheel with respect to the vehicle. Rather, in a "semi-active suspension", the characteristics of the suspension (e.g., the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g., raise or lower) a wheel with respect to the vehicle. As such, it will be understood that an "remotely controllable active valve", as defined above, is well suited for use in a "pure active suspension" or a "semi-active suspension".

In one embodiment, the damping characteristic of at least one damper is obtained by controlling a remotely adjustable remotely controllable active valve (may also be referred to as a remotely adjustable electronic valve or, more concisely, as just an remotely controllable active valve) of the damper, wherein the remotely adjustable remotely controllable active valve utilizes a relatively small solenoid (using relatively low amounts of power) to generate relatively large damping forces. Examples of such a remotely controllable active and semi-active valves and their features are described and shown in U.S. Pat. Nos. 8,627,932; 8,857,580; 9,033,122; 9,120,362; and 9,239,090 the content of which are incorporated by reference herein, in their entirety.

Referring now to FIG. 1A, a perspective view of a sway bar system 100 including a sway bar 12 and two electronically controlled damper links, 14L and 14R, is shown in accordance with one embodiment. For purposes of clarity, in FIG. 1A, electronically controlled damper link 14L and electronically controlled damper link 14R are shown slightly separated from sway bar 12 in order to more clearly depict the location of connection 13L, where electronically controlled damper link 14L couples to sway bar 12, and to more clearly depict the location, 13R, where electronically controlled damper link 14R couples to sway bar 12. In various embodiments of sway bar system 100, an upper portion of electronically controlled damper link 14L includes a bushing, or similar coupling feature, to readily enable coupling of electronically controlled damper link 14L to, for example, at connection 13L of sway bar 12. Similarly, in various embodiments of sway bar system 100, an upper portion of electronically controlled damper link 14R includes a bushing, or similar coupling feature, to readily enable coupling of electronically controlled damper link 14R to, for example, 13R of sway bar 12. It should be noted that sway bar system 100 is not limited solely to the use of a bushing for coupling one or both of electronically controlled damper link 14L and electronically controlled damper link 14R to sway bar 12.

With reference still to FIG. 1A, in various embodiments of sway bar system 100, a lower portion of electronically controlled damper link 14L includes an eyelet, or similar coupling feature, to readily enable coupling of electronically controlled damper link 14L to a location on a vehicle. Similarly, in various embodiments of sway bar system 100, a lower portion of electronically controlled damper link 14R includes an eyelet, or similar coupling feature, to readily enable coupling of electronically controlled damper link 14R to a location on a vehicle. It should be noted that sway bar system 100 is not limited solely to the use of an eyelet for coupling one or both of electronically controlled damper link 14L and electronically controlled damper link 14R to a vehicle.

Although the embodiment of FIG. 1A, depicts sway bar system 100 having two electronically controlled damper links 14L and 14R, in another embodiment, sway bar system 100 includes only a single electronically controlled damper link (e.g., only 14L or only 14R). In such an embodiment, an electronically controlled damper link (e.g., 14L or 14R) is coupled to one end (e.g., a first end) of sway bar 12, and, for example, a conventional end link is coupled to the other end (e.g., a second end) of sway bar 12. Hence, sway bar system 100 is well suited to embodiments in which one end of sway bar 12 has an electronically controlled damper link (e.g., 14L or 14R) coupled thereto, and also to embodiments in which both ends of sway bar 12 have an electronically controlled damper link (e.g., 14L and 14R, respectively) coupled thereto. Additionally, for purposes of conciseness and clarity, portions of the following description may refer to an electronically controlled damper link as "electronically controlled damper link 14", instead repeating the same description for each of electronically controlled damper link 14L and electronically controlled damper link 14R. It should be noted that such portions of the description are applicable to either electronically controlled damper link 14L or electronically controlled damper link 14R, as shown in sway bar system 100 of FIG. 1A. Further, the description will pertain to embodiments in which one end of sway bar 12 has an electronically controlled damper electronically controlled damper link (e.g., 14L or 14R) coupled thereto, and also to embodiments in which both ends of sway bar 12 have an electronically controlled damper link (e.g., 14L and 14R, respectively) coupled thereto.

Figure 2:
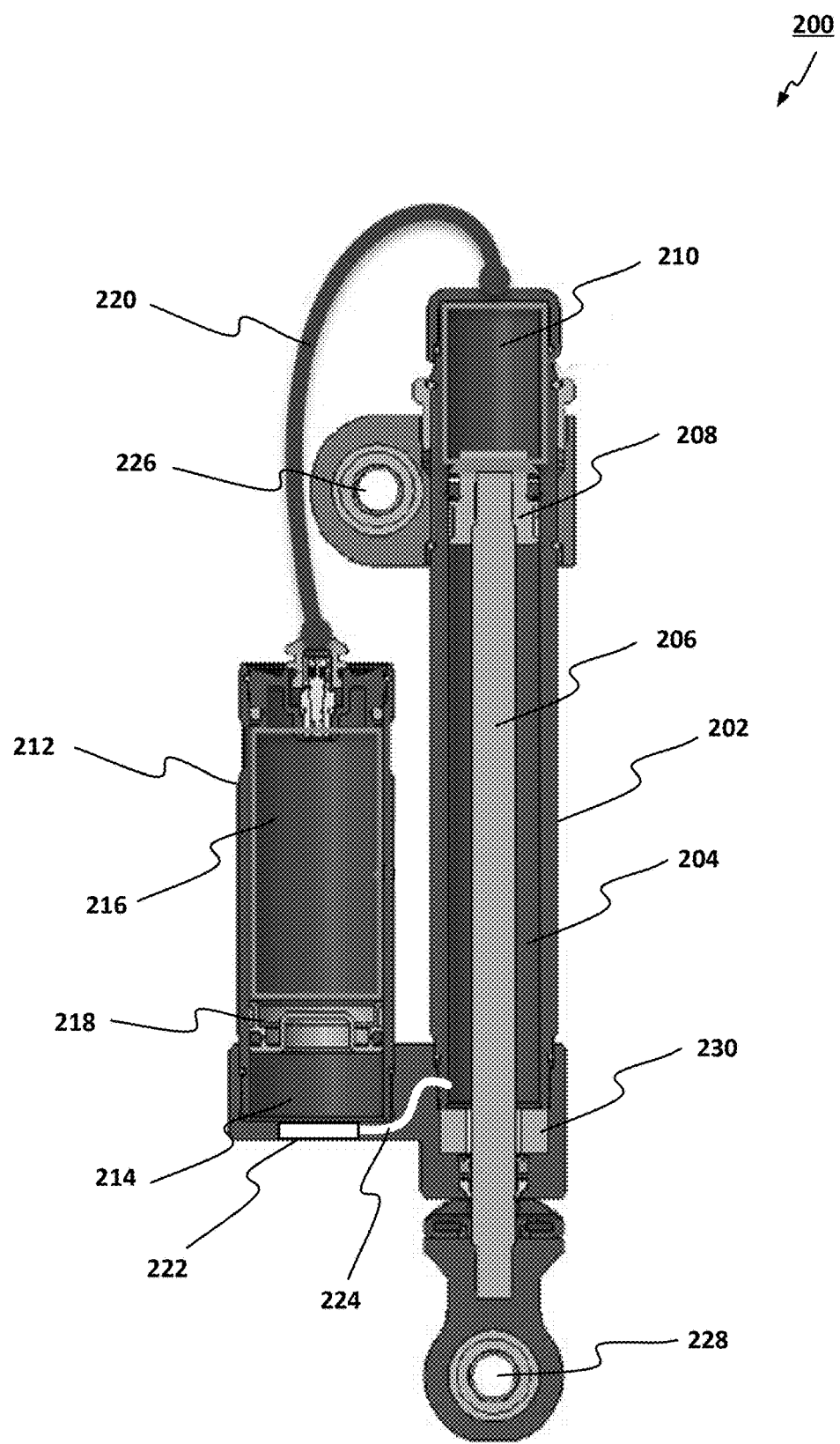
FIG. 2 is a cross-section view of a damper link with a hose, shown in accordance with an embodiment.

Also included in FIG. 1A are body 202, through shaft 204, connector 206, and connection 213, further discussion of which is provided in the discussion of FIG. 2 herein.

Figure 1B:
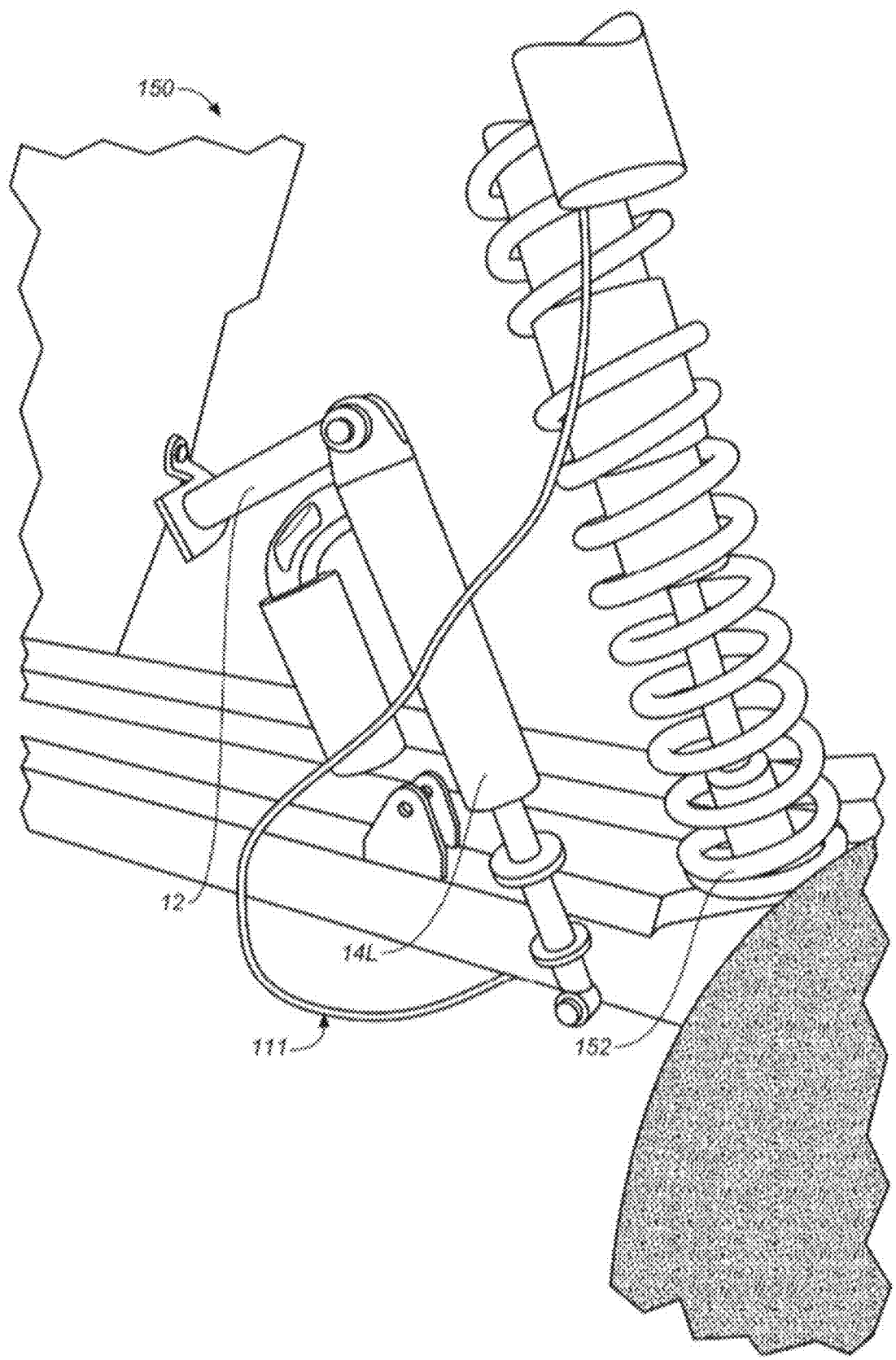
FIG. 1B is a perspective view of sway bar system, of FIG. 1A, installed in a vehicle, in accordance with one embodiment.

With reference now to FIG. 1B, a perspective view 150 is provided of sway bar system 100, of FIG. 1A, installed in a vehicle, in accordance with one embodiment. In the embodiment of FIG. 1B, sway bar 12 and at least one electronically controlled damper link 14L is shown installed in a vehicle 152. In one embodiment, sway bar system 100 is coupled to a vehicle with at least one end of sway bar 12 coupled to the vehicle by an electronically controlled damper link (e.g., 14L or 14R). That is, unlike conventional sway bar assemblies, in one embodiment, sway bar system 100 has one end of sway bar 12 coupled to a vehicle by an electronically controlled damper link (e.g., 14L or 14R).

In one embodiment, sway bar system 100 has both ends of sway bar 12 coupled to a vehicle by an electronically controlled damper link (e.g., 14L and 14R, respectively). As a result, and as will be described further below, the "stiffness" provided by sway bar system 100 can be remotely controlled by controlling the stiffness or compliance of one or both of electronically controlled damper links 14L and 14R coupling sway bar 12 to a vehicle. Importantly, FIG. 1B further shows a cable 111. Cable 111 is used to provide input to electronically controlled damper link 14. Such input is used to control the damping characteristics of electronically controlled damper link 14. In various embodiments, as are described below in detail, such input may consist of electrical input (based upon, e.g., user input, sensors-derived data, or any of various other sources) used to control an electronic valve within electronically controlled damper link 14 and, correspondingly, control the damping characteristics of electronically controlled damper link 14. Embodiments of the sway bar system 100 are also well suited to using a wireless signal (in addition to, or in lieu of, cable 111) to control a valve or other component of electronically controlled damper link 14 such that, ultimately, the damping characteristic of electronically controlled damper link 14 is controllable.

Figure 1C:
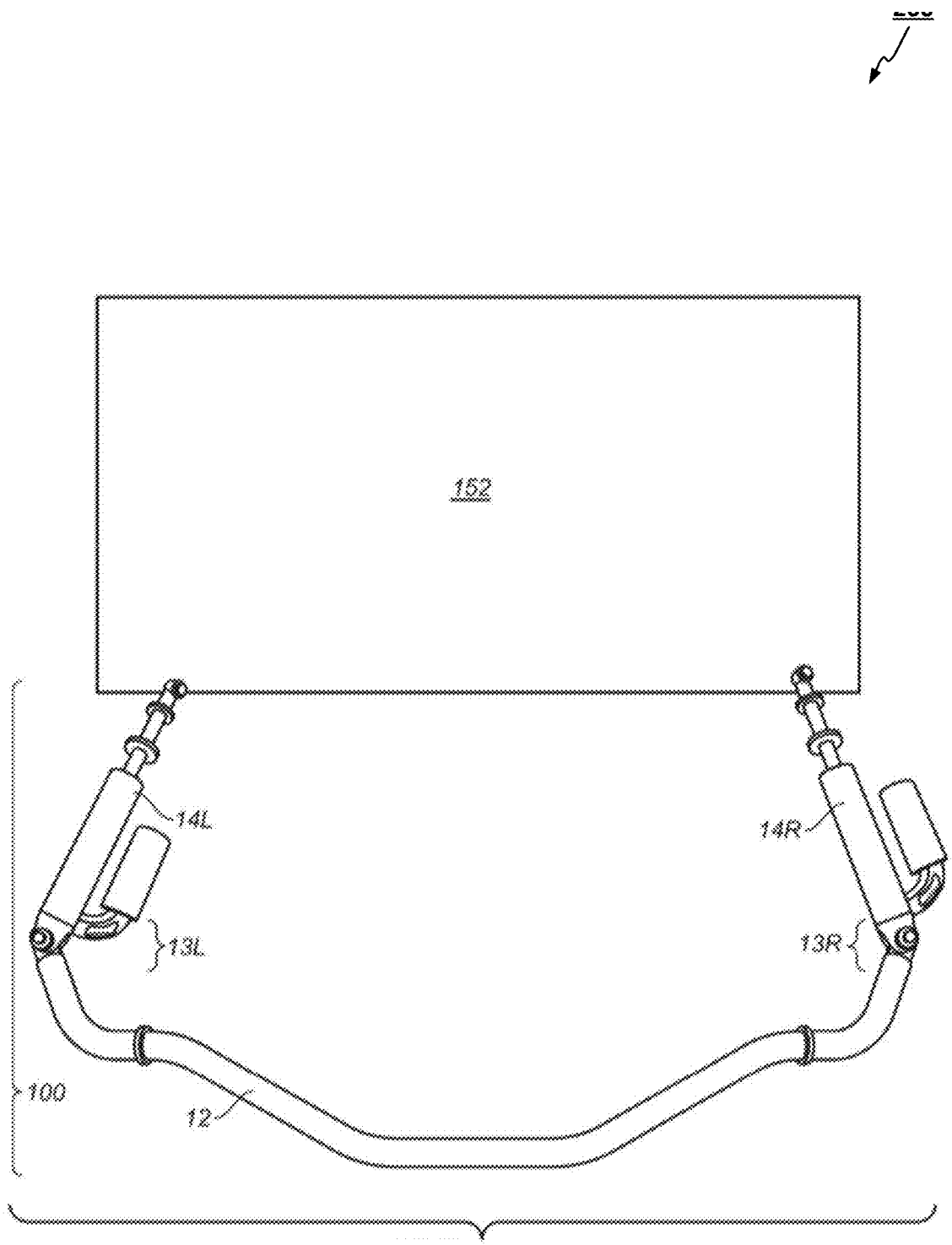
FIG. 1C is a perspective view is provided of sway bar system having electronically controlled damper link coupled to a first end of sway bar.

Referring now to FIG. 1C, a perspective view is provided of sway bar system 100 having electronically controlled damper link 14L coupled to a first end of sway bar 12 at location 13L. In the embodiment of FIG. 1C, sway bar system 100 further includes electronically controlled damper link 14R coupled to a second end of sway bar 12 at location 13R. Additionally, as schematically depicted in FIG. 1C, in the embodiment, electronically controlled damper link 14L is coupled to vehicle 152, and electronically controlled damper link 14R is coupled to vehicle 152. In one embodiment, electronically controlled damper link 14L and electronically controlled damper link 14R are coupled to vehicle 152 at a location, for example, near a wheel or axle (such as coupled to a control arm or other suspension feature) of vehicle 152 at respective left and right sides of vehicle 152. It will be understood that when the left and right sides of the suspension of vehicle 152 move relative to one another, sway bar 12 of sway bar system 100 is subjected to torsion and forced to twist. The twisting of sway bar 12 will transfer forces between a heavily-loaded suspension side of vehicle 152 to the opposite, lesser-loaded, suspension side of vehicle 152.

Figure 1D:
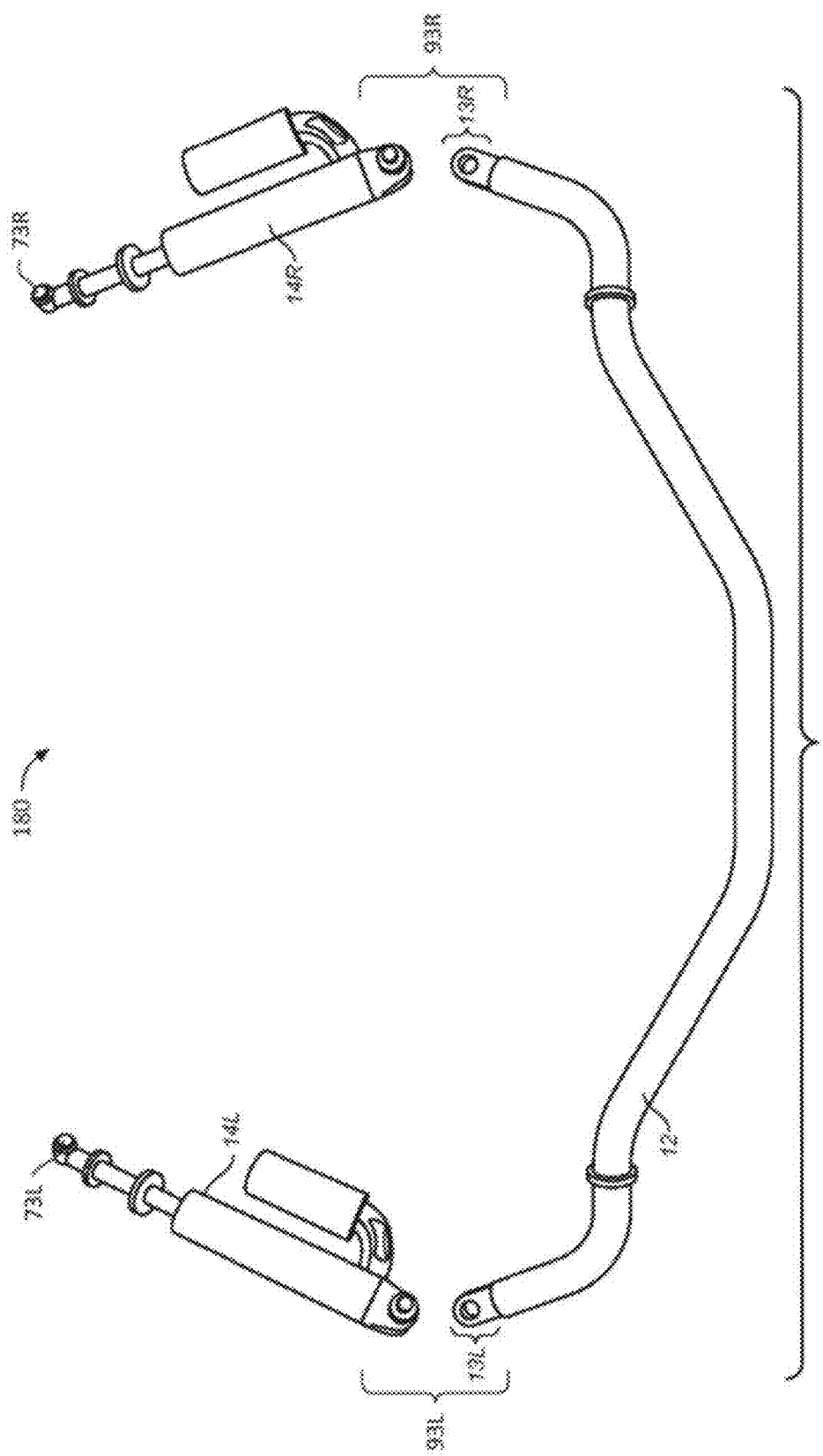
FIG. 1D is a perspective view of a sway bar system including a sway bar, two electronically controlled damper links, and two electronically controlled physical disconnects, in accordance with one embodiment.

Referring now to FIG. 1D, a perspective view of a sway bar system 180 including a sway bar 12, two electronically controlled damper links, e.g., electronically controlled damper link 14L and electronically controlled damper link 14R, and two electronically controlled physical disconnects, e.g., electronically controlled physical disconnect 93R and electronically controlled physical disconnect 93L, are shown in accordance with one embodiment. Although two electronically controlled physical disconnects are shown in FIG. 1D, it is appreciated that in another embodiment, sway bar 12 would have only a single electronically controlled physical disconnect, or a plurality of electronically controlled physical disconnect. Further, although two electronically controlled damper links are shown in FIG. 1D, it is appreciated that in another embodiment, sway bar 12 would have no electronically controlled damper links, one electronically controlled damper link, or a plurality of electronically controlled damper links.

For purposes of clarity, in FIG. 1D, electronically controlled damper link 14L and electronically controlled damper link 14R are shown slightly separated from sway bar 12 in order to more clearly depict the location of electronically controlled physical disconnect 93L, where electronically controlled damper link 14L would, in one embodiment, be physically coupled with, or physically disconnected from, sway bar 12 at connection 13L; and to more clearly depict the location of electronically controlled physical disconnect 93R, where electronically controlled damper link 14R would, in one embodiment, be physically coupled with, or physically disconnected from, sway bar 12 at connection 13R.

In one embodiments of sway bar system 180, electronically controlled physical disconnect 93L includes a linear actuator, rotary actuator, or other electronically controllable coupling feature (similar in functionality to the solenoid valve operation disclosed in remotely controllable active valve), to allow electronically controlled damper link 14L to be physically coupled with and physically disconnected from, sway bar 12 at connection 13L. Similarly, in one embodiments of sway bar system 180, electronically controlled physical disconnect 93R includes a linear actuator, rotary actuator, or other electronically controllable coupling feature (similar in functionality to the solenoid valve operation disclosed in remotely controllable active valve), to allow electronically controlled damper link 14R to be physically coupled with and physically disconnected from, sway bar 12 at connection 13R. It should be noted that in one embodiment, sway bar system 180 is not limited solely to the use of a bushing for electronically controlled physical disconnect 93L or electronically controlled physical disconnect 93R.

With reference still to FIG. 1D, in one embodiment of sway bar system 180, a portion of electronically controlled damper link 14L includes an eyelet 73L, or similar coupling feature, to readily enable coupling of electronically controlled damper link 14L to a location on a vehicle. Similarly, in one embodiment of sway bar system 180, a portion of electronically controlled damper link 14R includes an eyelet 73R, or similar coupling feature, to readily enable coupling of electronically controlled damper link 14R to a location on a vehicle. It should be noted one embodiment of sway bar system 180 uses a connection other than an eyelet for coupling one or both of electronically controlled damper link 14L and electronically controlled damper link 14R to a vehicle.

In one embodiment, the electronically controlled physical disconnect 93L (or electronically controlled physical disconnect 93R) is a portion of electronically controlled damper link 14L (or electronically controlled damper link 14R, respectively).

In one embodiment, electronically controlled physical disconnect 93L (or electronically controlled physical disconnect 93R) is a portion of electronically controlled damper link 14L (or electronically controlled damper link 14R, respectively) located at an opposite end of the eyelet 73L (or eyelet 73R, respectively) portion of electronically controlled damper link 14L (or electronically controlled damper link 14R, respectively).

Although, in one embodiment, sway bar system 180 is disclosed as having two electronically controlled damper links and two electronically controlled physical disconnects, it should be appreciated that other embodiments of sway bar system 180 would include a different number of electronically controlled damper links and/or electronically controlled physical disconnects, such as a single electronically controlled physical disconnect, or a plurality of electronically controlled physical disconnect, no electronically controlled damper links, one electronically controlled damper link, or a plurality of electronically controlled damper links, and the combinations therefrom as discussed in some of the examples below. Further, it should be understood that the following embodiments are provided for clarity, and are not meant to be exhaustive. Instead, one or more embodiments could include other configurations, additional electronically controlled damper links and/or electronically controlled physical disconnects which may be located at different locations along sway bar 12, and the like.

For example, in one embodiment, sway bar system 180 includes only a single electronically controlled damper link (e.g., electronically controlled damper link 14L or electronically controlled damper link 14R), and both of electronically controlled physical disconnect 93R and electronically controlled physical disconnect 93L. In one example of such an embodiment, electronically controlled damper link 14L is used at one end of sway bar 12 such as to couple with connection 13L, and a conventional end link (or the like) is coupled to the other connection 13R. Hence, sway bar system 180 is well suited to embodiments in which one end of sway bar 12 has an electronically controlled damper link (e.g., electronically controlled damper link 14L or electronically controlled damper link 14R) coupled thereto, and also to embodiments in which both ends of sway bar 12 have an electronically controlled damper link (e.g., electronically controlled damper link 14L and electronically controlled damper link 14R) coupled thereto.

In one embodiment, sway bar system 180 includes only a single electronically controlled damper link (e.g., electronically controlled damper link 14L or electronically controlled damper link 14R), and only a single electronically controlled physical disconnect (e.g., electronically controlled physical disconnect 93R or electronically controlled physical disconnect 93L). In one example of such an embodiment, electronically controlled damper link 14L is used at one end of sway bar 12 such as to couple with connection 13L via electronically controlled physical disconnect 93L, and a conventional end link (or the like) is coupled to the other connection 13R without an electronically controlled physical disconnect 93R.

In another embodiment, electronically controlled damper link 14L is used at one end of sway bar 12 such as to couple with connection 13L without an electronically controlled physical disconnect 93L, and a conventional end link (or the like) is coupled to the other connection 13R having electronically controlled physical disconnect 93R.

In one embodiment, sway bar system 180 includes both electronically controlled damper link 14L and electronically controlled damper link 14R, and only a single electronically controlled physical disconnect (e.g., electronically controlled physical disconnect 93R or electronically controlled physical disconnect 93L). In one example of such an embodiment, electronically controlled damper link 14L is used at one end of sway bar 12 such as to couple with connection 13L via electronically controlled physical disconnect 93L, and electronically controlled damper link 14R is coupled to the other connection 13R without an electronically controlled physical disconnect 93R.

In another example of such an embodiment, electronically controlled damper link 14L is used at one end of sway bar 12 such as to couple with connection 13L via without an electronically controlled physical disconnect 93L, and electronically controlled damper link 14R is coupled to the other connection 13R via electronically controlled physical disconnect 93R.

As such, sway bar system 180 is well suited to embodiments in which one or both ends of sway bar 12 have an electronically controlled damper links coupled thereto, and also to embodiments in which one or both ends of sway bar 12 are coupled to one or more electronically controlled damper links (and/or a conventional end link) via one or both of electronically controlled physical disconnects.

For purposes of conciseness and clarity, portions of the following description may refer to the electronically controlled physical disconnect as "electronically controlled physical disconnect 93", instead repeating the same description for each of electronically controlled physical disconnect 93L and electronically controlled physical disconnect 93R. It should be noted that such portions of the description are applicable to either electronically controlled physical disconnect 93L or electronically controlled physical disconnect 93R, as shown in sway bar system 180 of FIG. 1D. Further, the description will pertain to embodiments in which one or both ends of sway bar 12 have electronically controlled physical disconnects coupled therewith, and also to embodiments in which one or both ends of sway bar 12 are coupled to one or more electronically controlled damper links (and/or a conventional end link) via one or both of electronically controlled physical disconnects.

Typically, when going from a disconnected state to a connected state or from a connected to state to a disconnected state a sway bar system can experience large amounts of rod reaction force depending upon the position of the system. The rod reaction force can occur in an initial state or a ramp-up state. A large amount of effort may be required to extend and end link to overcome the rod reaction force when a valve is powered. Embodiments discussed herein connect a positive gas chamber to a negative gas chamber in the end link damper system to allow for air chamber volume to remain constant and thus reduce the rod reaction force.

Referring now to FIG. 2, a cross section view of a damper link 200 in a compressed or nearly compressed state. Damper link 200 is depicted as including damper chamber 202, first fluid reservoir 204, shaft 206, piston 208, negative gas chamber 210, additional reservoir housing 212, second fluid reservoir 214, positive gas chamber 216, internal floating piston (IFP) 218, hose 220, base valve 222, fluid path 224, first connector 226, second connector 228, and bearing 230. The damper link 200 can be referred to as a damping link or an end link associated with a sway bar system. In one embodiment, damper link 200 is an alternate configuration for the two electronically controlled damper links 14L and 14R of FIGS. 1A-1D that includes hose 220 that provides fluid communication between negative gas chamber 210 and positive gas chamber 216. Depending upon the design of damper chamber 202, first connector 226 can be placed in a different location along damper chamber 202 as compared to the connectors of the two electronically controlled damper links 14L and 14R of FIGS. 1A-1D. In one embodiment, damper link 200 is a QSE disconnect link.

In one embodiment, damper chamber 202 can include first fluid reservoir 204 which can be filled with a fluid such as oil. Damper chamber 202 can also include negative gas chamber 210 which can be filled with a gas such as air or nitrogen. In one embodiment, shaft 206 can move relative to damper chamber 202 such that piston 208 moves within first fluid reservoir 204 and can compress or decompress the fluid in first fluid reservoir 204 and the gas in negative gas chamber 210. FIG. 2 depicts shaft 206 and piston 208 fully inserted or nearly fully inserted in damper chamber 202. As the fluid is compressed or pressurized in first fluid reservoir 204, the fluid can move from first fluid reservoir 204 to second fluid reservoir 214 via fluid path 224 and pass through base valve 222. Fluid moving into second fluid reservoir 214 can increase a pressure in second fluid reservoir 214 and thus cause IFP 218 to move within additional reservoir housing 212 thus increasing the size or volume of second fluid reservoir 214. Such movement of IFP 218 decreases a size or volume of positive gas chamber 216 and can increase a pressure or compress the gas in positive gas chamber 216.

As a sway bar, such as sway bar 12, moves then piston 208 will move within damper chamber 202 depending on the direction the sway bar moves. As piston 208 moves in either direction, fluid will flow between first fluid reservoir 204 and second fluid reservoir 214 through base valve 222 and fluid path 224. In one embodiment, opening or closing base valve 222 can control damper link 200 such that damper link 200 can be physically disconnected from or physically connected to a sway bar as is described above in reference to FIG. 1C.

In one embodiment, base valve 222 is located within additional reservoir housing 212, and is fluidly connected to fluid path 224. In one embodiment, base valve 222 is placed to allow flow through the side with less flow (e.g., the base valve 222 is placed on a rebound side in line with the system). In one embodiment, base valve 222 has valving to limit the direction of fluid flow. In one embodiment, the valving of base valve 222 controls fluid flow between first fluid reservoir 204 and second fluid reservoir 214.

The available fluid volume within damper chamber 202 changes as shaft 206 and piston 208 move in and out of damper chamber 202. For example, the amount of damping fluid which can be held within damper chamber 202 is reduced when the shock assembly is completely compressed such that the piston shaft is largely within the damping chamber (thereby displacing damping fluid by the volume of the shaft). In a typical shock assembly, there is a compressible gas volume in fluid communication with the damping chamber to allow the shaft displaced fluid volume to be taken up by compression of the compressible gas volume. Deleteriously, during operation of the shock assembly in rapid compression under relatively high load, the compressible gas volume can be suddenly collapsed (if the pressure induced by the load is much higher than the gas volume pressure and such pressure can be freely communicated to the gas volume) thereby subverting the damping operation of the piston and allowing the piston to fully compress into the damping chamber at a high rate. During such a compression event, damping fluid is not properly transferred to the rebound side of the damping piston and a vacuum is created or "pulled" on the rebound side of the piston due to lack of timely fluid back fill. That vacuum "bubble" then collapses as the compression rate slows near completion of the loading event which caused the rapid compression. Such vacuum formation and collapse are known as cavitation and that can be both damaging to hardware and quite noisy. It is desirable to prevent such a cavitation event (and the corresponding malfunction of the damper under high load). This problem may be solved using a device to meter fluid flow from the compression side of the damping piston to the compressible gas volume.

A base valve (e.g., a base plate). In different embodiments, a base valve is similar to a piston in that it may have holes, shims and a jet in its center. Often, the base valve is fixed in the damping chamber, usually between the piston and the IFP to create a third chamber therein. Basically, during the compression stroke, the base valve allows the displacement of a volume of working fluid equal to the shaft volume entering the damping chamber, which moves the IFP. However, the base valve also maintains the resistance necessary to force working fluid through the piston. During the rebound stroke, the gas behind the IFP presses outward and working fluid is able to move through the base valve back into the compression chamber.

As such, the base valve allows a decrease (or even elimination) of a pressure of the gas in the shock assembly. Moreover, the base valve prevents cavitation in the working fluid, but doesn't increase the force necessary to move the shaft. This allows the shock assembly to respond better at low shaft speeds, such as for example on a smoother surface, where the shaft isn't moving as quickly as it would if the vehicle were traversing a lot of bumps.

In one embodiment, base valve 222 is a pilot valve. In one embodiment, to operate a pilot valve to open the valve gas pressure may be needed to fully open the valve or energize the valve. For example, gas pressure may be needed to open a pilot valve when damper link 200 is operating in the collapsing direction. Hose 220 can provide such pressure as hose 220 maintains a constant gas pressure between negative gas chamber 210 and positive gas chamber 216. It should be appreciated that base valve 222 may be a modal valve, a semi active valve, an active valve, a passive valve, an IQS valve, a two stage valve, etc. base valve 222 may be controlled remotely or manually, depending on the embodiment.

Physically connecting or disconnecting a sway bar using damper link 200 can encounter a large amount of rod reaction force during either an initial phase or a ramp-up phase. For example, for damper link 200 to work when collapsing, damper link 200 needs a certain amount of gas force to open base valve 222 but then gas force can create a rod reaction force that adds total force to the length. The combination of gas frame ramp up force and the dampening force created in base valve 222 creates the total force in damper link 200 that be found at a given speed or displacement of damper link 200. This total force can create difficultly in connecting or disconnecting damper link 200 with the sway bar. For example, if a vehicle is on a level surface, the rod reaction force may decrease and there may not be difficulty in connecting or disconnecting damper link 200 with the sway bar. However, if the vehicle is on uneven ground, such as one wheel on a rock and another wheel on a different surface or suspended in air, then the rod reaction force may increase thus making it difficult for damper link 200 to connect or disconnect with the sway bar.

In various embodiments, a solution to overcoming this rod reaction force is to fluidly connect negative gas chamber 210 to positive gas chamber 216. This can be accomplished via hose 220. For example, in prior solutions, as the length of damper link 200 extends, negative gas chamber 210 can increase in volume while positive gas chamber 216 decreases in volume and respectively changes the pressure within negative gas chamber 210 and positive gas chamber 216. With hose 220 fluidly connecting negative gas chamber 210 with positive gas chamber 216, the pressure in negative gas chamber 210 and positive gas chamber 216 remains constant and the same as one another. This constant pressure between negative gas chamber 210 and positive gas chamber 216 reduces the rod reaction force during reflow in the collapsing direction when the fluid flows back across base valve 222.

In one embodiment, fluidly connecting negative gas chamber 210 to positive gas chamber 216 via hose 220 can cause auto extending in damper link 200. For example, linking hose 220 can cause positive pressure in negative gas chamber 210 and cause pressure on an area on top of piston 208. Then when base valve 222 is energized, damper link 200 can auto extend. Auto extending can occur when the pressure overcomes the seal friction and damper link 200 does not stay collapsed.

In one embodiment, the fluid communication provided by hose 220 between negative gas chamber 210 and positive gas chamber 216 remains open during operations of the vehicle and the sway bar system including damper link 200. In one embodiment, the fluid of damper link 200 can have a pressure of 200 psi. This pressure on the fluid can be used to push the fluid through valves. Embodiments with hose 220 that connects negative gas chamber 210 to positive gas chamber 216 can allow for a robust valve to be used for base valve 222 such as a pilot valve. Such a robust valve can allow damper link 200 to maintain a high fluid pressure such as 200 psi.

Figure 3:
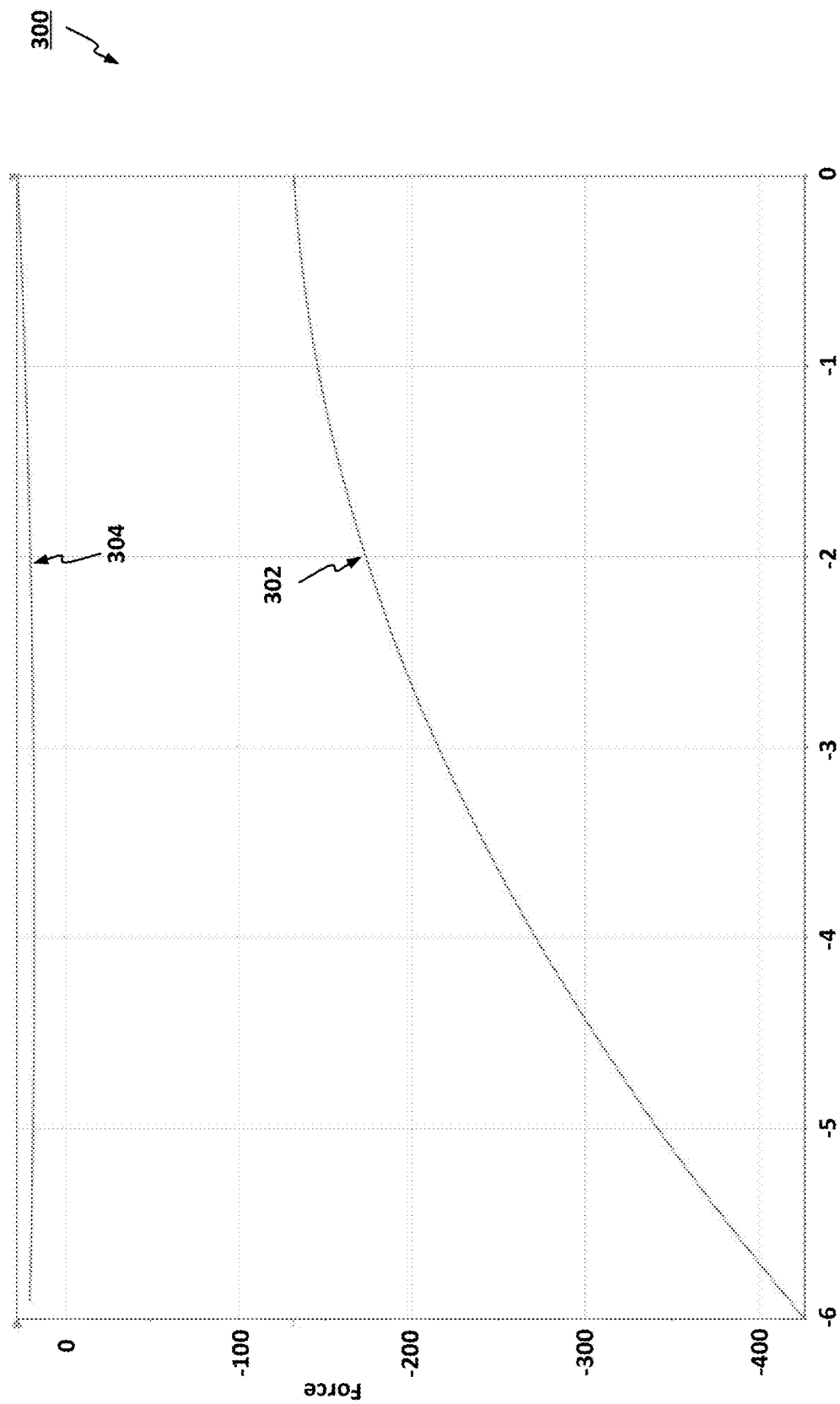
FIG. 3 is a graph of rod reaction force, shown in accordance with an embodiment.

With reference now to FIG. 3, a graph 300 of rod force in a damper link for a sway bar system. Graph 300 displays a travel of a rod vs. a force in pounds. Line 302 depicts an embodiment without a hose linking a negative gas chamber to a positive gas chamber and demonstrates the rod reaction force increases with travel. Line 304 depicts an embodiment with a hose linking or fluidly communicating a negative gas chamber to a positive gas chamber and demonstrates the rod reaction force does not change with travel.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. A sway bar system, comprising:
   a first damper link comprising:
      a damper chamber with a first fluid reservoir;
      a shaft configured to move in an out said damper chamber;
      a piston connected to an end of said shaft and configured to move within said damper chamber;
      a negative gas chamber housed in said damper chamber wherein a gas in said negative gas chamber is compressed or decompressed by a movement of said piston;
      an additional reservoir comprising:
         a second fluid reservoir;
         a positive gas chamber;
         an internal floating piston that movably separates said second fluid reservoir from said positive gas chamber; and
      a hose fluidly connecting said negative gas chamber to said positive gas chamber to maintain a constant gas pressure between said negative gas chamber to said positive gas chamber;
   a second damper link; and
   a sway bar with a first end connected to a first connector of said first damper link and second end of said sway bar connected to first connector of said second damper link.

2. The sway bar system of claim 1, wherein said first damper link further comprising:
   a base valve to control a flow of fluid between said first fluid reservoir and said second fluid reservoir and provides an ability to switch between a rigid sway bar connection or a loose sway bar connection.

3. The sway bar system of claim 2, wherein said base valve is a pilot valve.

4. The sway bar system of claim 2, wherein said base valve is selected from a group consisting of a modal valve, a semi active valve, an active valve, a passive valve, and a two-stage valve.

5. The sway bar system of claim 2, wherein said base valve is a remotely controlled valve.

6. The sway bar system of claim 2, wherein said base valve is a manually controlled valve.

7. The sway bar system of claim 1 wherein, said first damper link and said second damper link are capable of self-centering said sway bar.

8. A vehicle sway bar system comprising:
   a vehicle;
   a sway bar;
   at least one damper link connecting said sway bar to said vehicle, wherein said at least one damper link comprises:
      a damper chamber with a first fluid reservoir;
      a shaft configured to move in an out said damper chamber;
      a piston connected to an end of said shaft and configured to move within said damper chamber;
      a negative gas chamber housed in said damper chamber wherein a gas in said negative gas chamber is compressed or decompressed by a movement of said piston;
      an additional reservoir comprising:
         a second fluid reservoir;
         a positive gas chamber;

an internal floating piston that movably separates said second fluid reservoir from said positive gas chamber; and a hose fluidly connecting said negative gas chamber to said positive gas chamber to maintain a constant gas pressure between said negative gas chamber to said positive gas chamber.

9. The vehicle sway bar system of claim 8, wherein said at least one damper link further comprising:

a base valve to control a flow of fluid between said first fluid reservoir and said second fluid reservoir and provides an ability to switch between a rigid sway bar connection or a loose sway bar connection.

10. The vehicle sway bar system of claim 9, wherein said base valve is a pilot valve.

11. The vehicle sway bar system of claim 9, wherein said base valve is selected from a group consisting of a modal valve, a semi active valve, an active valve, a passive valve, and a two-stage valve.

12. The vehicle sway bar system of claim 9, wherein said base valve is a remotely controlled valve.

13. The vehicle sway bar system of claim 9, wherein said base valve is a manually controlled valve.

* * * * *